United States Patent
Masaba

(10) Patent No.: US 11,586,999 B2
(45) Date of Patent: Feb. 21, 2023

(54) TAXI DISPATCH SYSTEM

(75) Inventor: Eric Masaba, West Sussex (GB)

(73) Assignee: Eric Masaba, Liverpool (GB)

( * ) Notice: Subject to any disclaimer, the term of this patent is extended or adjusted under 35 U.S.C. 154(b) by 596 days.

(21) Appl. No.: 11/485,164

(22) Filed: Jul. 12, 2006

(65) Prior Publication Data

US 2008/0015923 A1    Jan. 17, 2008

(51) Int. Cl.
*G06Q 10/06* (2012.01)
*H04W 4/029* (2018.01)
*H04L 67/12* (2022.01)
*H04L 67/52* (2022.01)
*G06Q 10/0631* (2023.01)

(52) U.S. Cl.
CPC ........ G06Q 10/06311 (2013.01); H04L 67/12 (2013.01); H04L 67/52 (2022.05); H04W 4/029 (2018.02)

(58) Field of Classification Search
CPC .... G06Q 10/00; G06Q 10/047; G06Q 10/063; G06Q 10/1093; G06Q 30/0284; G06Q 50/30; G06F 17/00; H04L 67/12; H04L 67/52
See application file for complete search history.

(56) References Cited

U.S. PATENT DOCUMENTS

| | | | | |
|---|---|---|---|---|
| 4,360,875 A * | 11/1982 | Behnke | ................ | G01C 21/00 379/93.02 |
| 5,945,919 A * | 8/1999 | Trask | ................ | G07B 13/00 340/8.1 |
| 6,430,496 B1 * | 8/2002 | Smith | ................ | G06Q 10/08 705/417 |
| 6,675,150 B1 * | 1/2004 | Camer | ................ | G06Q 10/025 705/7.33 |
| 6,756,913 B1 * | 6/2004 | Ayed | ................ | G07B 13/00 |
| 7,305,350 B1 * | 12/2007 | Bruecken | ................ | 705/346 |
| 8,483,962 B2 * | 7/2013 | Lin | ................ | G08G 1/205 455/456.1 |
| 2001/0037174 A1 * | 11/2001 | Dickerson | ................ | G08G 1/202 701/400 |
| 2002/0069093 A1 * | 6/2002 | Stanfield | ................ | 705/5 |
| 2002/0077876 A1 * | 6/2002 | O'Meara | ................ | G06Q 10/06 705/7.26 |
| 2002/0188549 A1 * | 12/2002 | Nordlicht | ................ | G06Q 50/188 705/37 |

(Continued)

FOREIGN PATENT DOCUMENTS

| | | |
|---|---|---|
| EP | 1298623 | 4/2003 |
| GB | 2367979 | 4/2002 |

OTHER PUBLICATIONS

"Finding a way to usability procurement of a taxi dispatch system", by H. Artman and S. Zallh, Springer-Verlag London Limited, May 2005.*

(Continued)

*Primary Examiner* — Pan G Choy
(74) *Attorney, Agent, or Firm* — Patterson Thuente, P.A.

(57) ABSTRACT

A method of transportation, comprising advertising to obtain customers to text or e-mail requests for transportation and receiving requests by text messaging for a ride from potential customers for transportation is disclosed. Responding to potential customers is by way of a response comprising ride information. Such ride information is also sent to a driver.

2 Claims, 5 Drawing Sheets

(56) References Cited

U.S. PATENT DOCUMENTS

| | | | | |
|---|---|---|---|---|
| 2003/0087648 | A1* | 5/2003 | Mezhvinsky | G06F 17/3087 455/456.1 |
| 2003/0177020 | A1* | 9/2003 | Okamura | G06Q 50/01 705/5 |
| 2004/0076280 | A1* | 4/2004 | Ando | G08G 1/202 379/220.01 |
| 2004/0131187 | A1* | 7/2004 | Takao et al. | 380/255 |
| 2004/0153325 | A1* | 8/2004 | Magee | 704/277 |
| 2004/0153370 | A1* | 8/2004 | Yang | 705/26 |
| 2004/0198376 | A1* | 10/2004 | Chandhok | H04L 67/04 455/519 |
| 2004/0260470 | A1* | 12/2004 | Rast | G06Q 10/06 701/300 |
| 2005/0033698 | A1* | 2/2005 | Chapman | G06Q 10/10 705/51 |
| 2005/0210110 | A1 | 9/2005 | Rutsch et al. | |
| 2006/0034201 | A1* | 2/2006 | Umeda | H04L 67/12 370/310 |
| 2006/0059023 | A1* | 3/2006 | Mashinsky | G06Q 10/02 705/5 |
| 2006/0276960 | A1* | 12/2006 | Adamczyk | G06Q 10/06 701/516 |
| 2008/0270204 | A1* | 10/2008 | Poykko | G06Q 30/0204 705/7.29 |

OTHER PUBLICATIONS

"Finding a way to usability procurement of a taxi dispatch system", by H. Artman and S. Zallh, Springer-Verlag London Limited, Jan. 2005.*

"Real Time Ridesharing using Wireless Pocket Phones to Access the Ride Matching Computer", by Edward Walbridge, National Louis University, Evanston, IL 60201; 1995.*

"A Prototype Web-based Carpooling System", by Peter Keenan and Shane Brodie, Department of Management Information Systems, University College Dublin, Dublin 4, Ireland; 2000.*

"A Macroscopic Taxi Model for Passenger Demand, Taxi Utilization and Level of Services", by Hai Yang et al., The Hong Kong University of Science and Technology; Transportation vol. 27: p. 317-340, 2000.*

"Taxi Management and Route Control", by William A. Bailey, Jr. and Thomas D. Clark, Jr. Proceedings of the 1992 Winter Simulation Conference.*

"A Prototype Web-based Carpooling System", by Peter Keenan and Shane Brodie, Proceedings of the Americas Conference on Information System, 2000.*

"A Real Time Taxi Dispatching Using Global Positioning Systems", by Ziqi Liao, Communications of the ACM, May 2003, vol. 46, No. 5.*

"A Simulation Analysis of Demand and Fleet Size Effects on Taxicab Service Rates", by William A. Bailey, Jr. and Thomas D. Clark, Jr. Proceedings of the 1987 Winter Simulation Conference.*

"A Taxi Dispatch System Based on Current Demands and Real-Time Traffic Conditions", by Lee et al., Transportation Network Modeling for Presentation at the 82nd Annual Meeting of the Transportation Research Board and Consideration of publication in Transportation Research Record, Nov. 12, 2002.*

"A Taxi Dispatch System Based on Current Demands and Real-Time Traffic Conditions", by Lee et al., Transportation Network Modeling for Presentation at the 82nd Annual Meeting of the Transportation Research Board and Consideration of publication in Transportation Research Record, Nov. 12, 2002. (Year: 2002).*

International Search Report, International Patent Application No. PCT/EP2007/006214, dated Jan. 2, 2008 (4 pages).

Eric Masaba, The Role of Computers in Transportation Technology, 1995, 14 pages.

Green Car Congress, Texting (SMS) for a Shared Taxi: Demand Responsive Transit Brokerage, Jul. 13, 2005, 2 pages.

Texxi—The Taxi You Text, Jul. 14, 2005, 1 page.

Jeremy Faludi, Leapfrogging in Reverse, Jul. 30, 2005, 7 pages.

Anne Rawland Gabriel, Pervasive Computing in Vehicles, Pervasive Computing Magazine, Oct.-Dec. 2005, 6 pages.

Eric Masaba, Texxi VC Pitch | Nov. 2005, Liverpool, UK | Dragons Doorstep, Uploaded 17 Jan. 17, 2011. Available at: http://www.slideshare.net/masabaer/dragons-eric, 4 pages.

Identifying Trading Opportunities by using Correlation Matrices to reduce the latency of response time through a nodal Credit Structure, 2003, 4 pages.

* cited by examiner

TAXI DISPATCH SYSTEM

TECHNICAL FIELD

The present invention relates to systems for providing transportation to individuals using, for example, automobiles while optimizing vehicle utilization, gas consumption and time consumption.

BACKGROUND

Traditionally, taxis are hailed while they are moving on streets, or at so-called taxi stations. Such stations may be formally provided by the municipality, or they may be de facto taxi stations, such as the fronts of prominent hotels.

A dispatch system lends significant economies to the above. More particularly, with dispatch systems, automobiles, such as taxis, are provided with two-way radios which allow the dispatcher to contact them and provide them with fares which are matched to their location.

SUMMARY OF THE INVENTION

In accordance with the invention, text messaging, through the use of, for example, ordinary cellular telephones, or through the use of handheld Internet communication devices or the like, is used to access a central data processor, for example, a computer, which, in turn, provides certain answers to the text messages, schedules drivers, pickup locations and pickup times, and provides certain checks to ensure that patrons show up for their cars.

BRIEF DESCRIPTION OF THE DRAWINGS

The description below will be understood in conjunction with the following drawing, in which.

DETAILED DESCRIPTION OF THE PREFERRED EMBODIMENTS

Figure 1A:
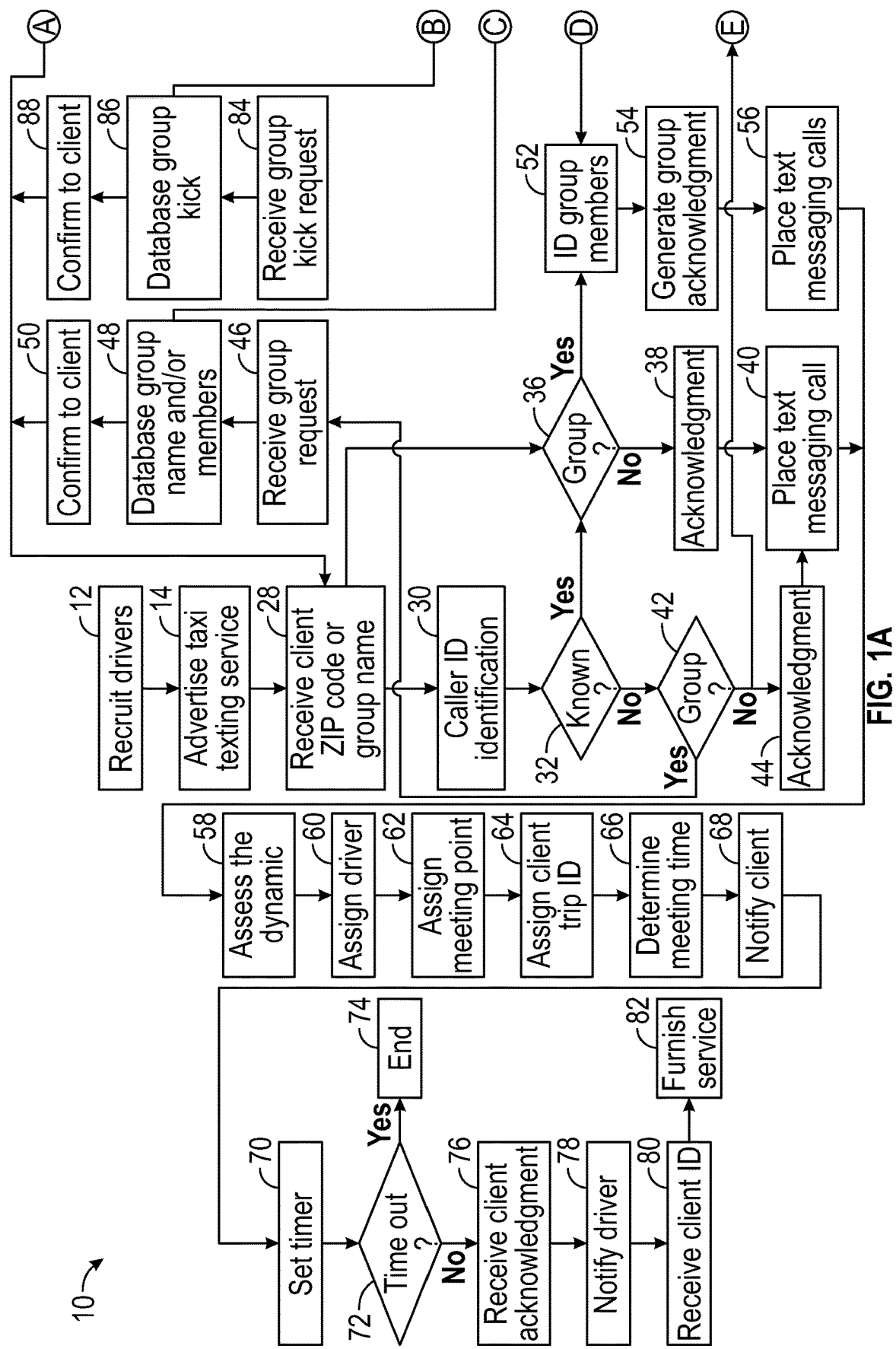
FIG. 1 is a block diagram of the method process/software for practicing the method of the present invention.
Figure 1B:
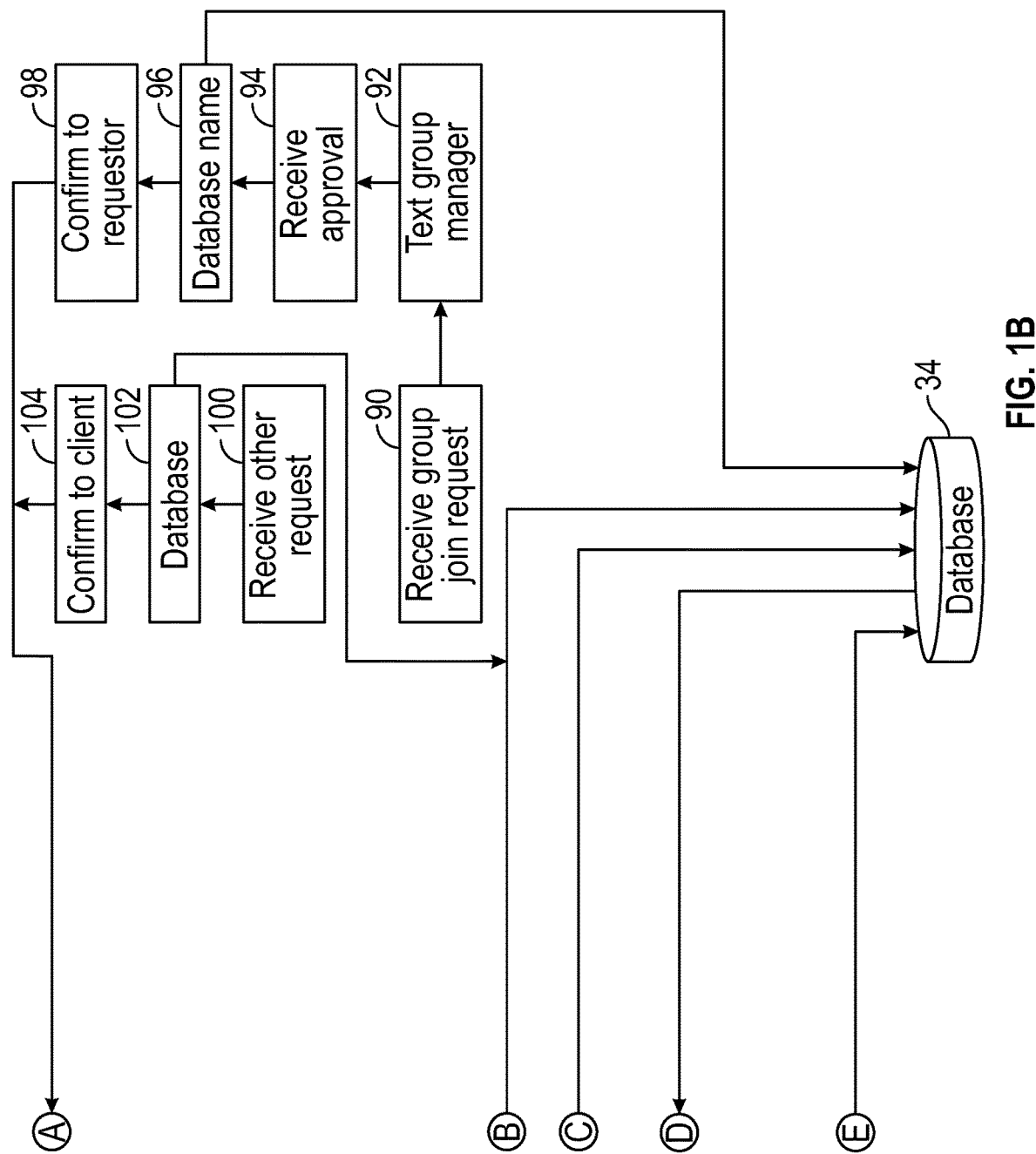
Figure 2:
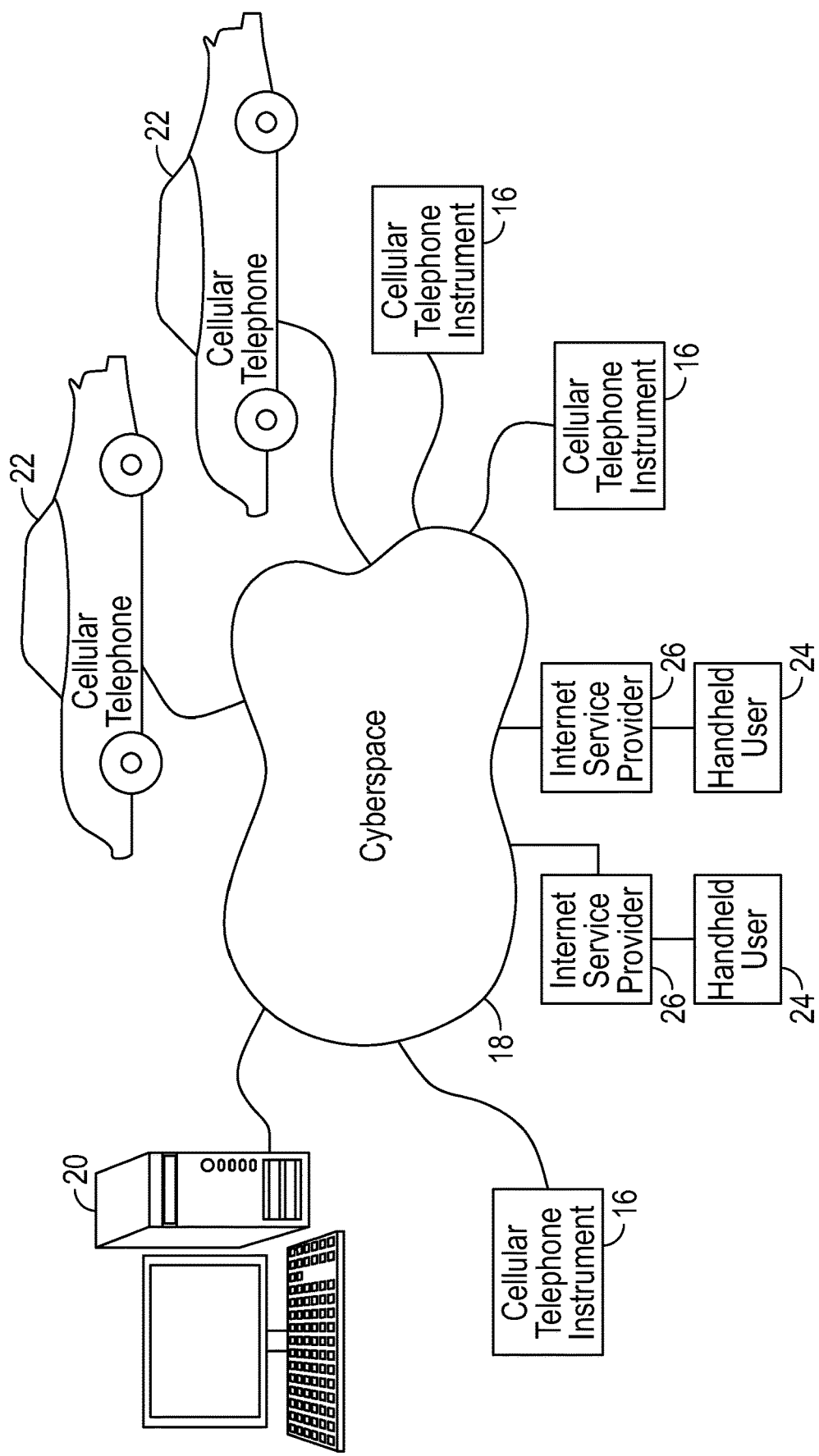
FIG. 2 is a schematic diagram of a system utilizing the method of the present invention.

Referring to FIG. 1, the control system, for example an electronic control system, may be understood. More particularly, in accordance with the present invention 10 the inventive method may be implemented by first recruiting drivers at step 12 and advertising the availability of a texting service for hailing taxis at step 14. In response, prospective clients of the taxi service 16 (FIG. 2), holding cellular telephones, can text their ZIP codes, postal codes or other geographic identifiers through cyberspace 18 to a central server 20 (on which the software of FIG. 1 is present), which acts to centrally process data by assessing available cars 22, for example taxis, and locations to which riders are traveling.

The objective of the present invention is to provide for a more efficient use of taxis during peak travel times. This is achieved by receiving requests from group managers for travel for a group of people, or from individuals for travel by that individual. The information respecting requests for multiple travel, single travel, and destinations, together with the number of individuals seeking travel to various locations is assessed by the system which assigns drivers on the basis of their availability (present and/or future) and location.

Prospective customer location may be automatically obtained from the cellular telephone system. In accordance with the invention, it is also possible for individuals 24 with handheld computing devices, such as Treo brand products and Blackberry brand products, to access server 20 through their respective Internet service providers 26. By the term "cyberspace" in this specification, reference is made to the overall public/private communications network including the so-called Internet, the telephone system, and private networks connected directly or indirectly into the system and together forming the virtual space within which and over which communications of all kinds may be sent.

Calls from prospective clients 16 and 24 are received at step 28. Optionally, at that point, the system may note the caller identification at step 30. If it is determined at step 32 that, with reference to database 34 the caller is known, it is first determined at step 36 whether the caller is known as a group manager who manages travel for a number of individuals, as opposed to a single user. This may be determined in response to caller ID information or registered group or registered user identification names assigned by the system when and if a user subscribes. If it is determined at step 36 that it is an individual, the system proceeds to step 38 where an acknowledgment message is selected. This acknowledgment is transmitted as a return text call at step 40. This acknowledgment may take the form of a text message advising the prospective patron that his or her taxi is being arranged.

In the conjunction with the subject specification, descriptions will be given with respect to a text message communications protocol. However, it is understood that email may be used in place, usually with the use of a handheld device instead of a cellular telephone, but still receiving and sending messages whose content is substantially the same as that for text messaging application of the present invention.

In accordance with the present invention, during advertising at step 14, prospective clients are advised to text in their ZIP codes, area codes, postal codes or other location identifier. This may be done for the first call. The first return call may give a user or group ID which is preferably used by the prospective client in future calls. In accordance with the present invention, it is expected that for most localities, zip codes, at least in United States are most appropriate in view of the relatively small geographic size of postal code areas.

Advertising may also direct potential patrons to text in not only their zip codes, but also a group request command. If it is determined that the caller is not known at step 32, the system may proceed to step 42. If it is determined at step 42 that the caller is not a group, the system will proceed directly to step 44 where an acknowledgment message is selected and transmitted at step 40 to the prospective client. At the same time, information respecting the caller ID is sent to database 34, for later use by the system.

If, optionally, it is determined at step 42 that a group set up is being requested by the caller, the system proceeds to step 46 where the user texts in a series of commands and information to set up a group. Alternately, this information may be inputted in back-and-forth communication. As yet another alternative, in response to a group request, the system may text back a list of information.

In the case of e-mail devices, the server 20 may e-mail a form to be filled out by the user.

Notwithstanding the communication method, at step 48 the system proceeds to input into database 34 the name of the group, the members of the group, the zip codes of the group members and any other optional information. The system will also recognize as group manager the individual initiating the call and setting up the group. Only the group manager will have the power to accept people into the group and to remove people from the group.

After seeing information at step 48, the system proceeds to step 50 where a confirming telephone call is made to the individual setting up the group. At the same time, information respecting client zip codes, group name and so forth is provided to the system at step 28 which then proceeds to step 36, where the request for taxi assignment is recognized as a group request.

In principle, this may be done in advance, to set up a group, for example in the morning for travel that evening. As will be described above, the transmission of text and advising the user of his travel particulars may simply be ignored, leaving the group information in place for later use.

If, at step 36, the system recognizes that the call is from a group, for example, because a group identification number was texted in by the user, the system proceeds to step 52 where it identifies the members of the group and their postal codes, for example their zip codes. At step 54 acknowledgments are selected for texting (or in the case of e-mail users, sent by e-mail), for example comprising a message that their trips are being arranged. These messages are then sent at step 56. In accordance with the preferred embodiment of the invention, this first message may give an identification to new users and groups.

After messages are sent at step 40 or 56, the system then proceeds to assess resources and needs at step 58. Based on this assessment, the system proceeds to assign a driver 22 at step 60. At step 62, a meeting point for driver and passengers is assigned. At step 64, an identification for that particular trip is assigned to the rider. Multiple riders in one vehicle may receive the same identification number. At step 66, a meeting time is assigned.

This information is then sent to the passenger or passengers at step 68.

After the information has been sent to the passengers, at step 68, the system proceeds to step 70 where a timer, for example one for five minutes, is set. In accordance with the preferred embodiment of the invention, this timer is employed in order to terminate the reservation if the prospective customer for the taxi ride does not confirm within five minutes that he is accepting the service. Alternatively, or in addition, the prospective passenger may text that he is declining to go forward with the ride.

If no response is received within the time period, at step 72 this is recognized by the system and the system proceeds to step 74 where the transaction is terminated. If, on the other hand, a client acknowledgment is received at step 76, the system notifies the driver at step 78 and provides the driver with the client identification at step 80. This may be done by cell phone, text messaging or email. This allows the driver to identify the client and furnish the service at step 82. Client identification can be done by the client showing the driver the client's last text message. The driver can compare this to his last text message. If desired one trip identification number may be used by all passengers.

As alluded to above, group managers have the power to control the members who belong to a given travel group. If the group manager wishes to remove an individual from the group, this is done by placing a text call at step 84. When this is received by the system at step 86, the system saves this information to database 34. At the same time, at step 88 this information is confirmed back to the group manager, who then optionally has the opportunity to initiate the calling of a taxi for his group. Likewise, an individual may choose to request to join a group at step 90 by texting to the server 20. The server then notifies the group manager at step 92 by text message. The group manager than texts his approval at step 94 causing the system to amend the database at step 96 and, optionally, confirm that amendment to the group manager at step 98. Likewise, other requests may be received by the system at step 100, sent to the database at step 102 and confirmed to the text message sender at step 104.

In accordance of the invention, if an individual is accompanied by three friends, charges would be assessed at, for example, $10 for each individual, or $40 for the group. Charges may be varied for different fare zones. While this may compare to the cost of the entire car of $20 for a similar ride, the objective is to fill each car thus doubling revenue to subsidize the cost of operating the system and optimistically, making a profit.

The objective of the inventive system is to address the shortage of cabs during high-traffic times, for example after 12:00 am on Friday and Saturday nights. Because patrons cannot get a cab so easily, or perhaps have to spend a long time to hail a cab, the system provides significant advantages.

In addition, there are other advantages. For example, individuals may stay at a party, a club, or the like later than they normally would and enjoy their time, only leaving when they know their taxi is waiting for them at the meeting point. This eliminates the need to waste time trying to hail a taxi.

In addition, the organization of groups, and the texting of a meeting point to numerous individuals who may be at various locations during the course of the night, provides an organizational infrastructure for individuals using the service. The organization of such groups also allows individuals who do not like to travel alone or with strangers to integrate into a group. For example, many women, perhaps older women would prefer to travel with a group of people whom they know in a taxi, as compared to public mass transportation. Thus, friends doing various things in the city on a given evening may, through their group manager, implement travel home in safe and relaxing circumstances. In the case of traveling home with strangers, the fact that the system schedules people to travel together who live in close proximity to each other may have additional social benefits.

It is also contemplated in accordance with the present invention that hotels, clubs, restaurants and bars, for example, may utilize a system to organize groups for their patrons. This may increase revenue from existing customers by allowing them to patronize the establishment on some of the busiest nights of the week when hailing a taxi can be difficult. People will also be able to remain in the establishments right until the last minute when they can quickly and easily get a taxi with the innovative system. This should increase sales. Moreover, the luxury experience of being able to remain seated until the last possible moment and texting in warmth and comfort should increase the enjoyability of, for example, a dining out experience.

In accordance with the invention, more customers are encouraged to come in from further afield. No designated driver is required and people will be confident that they can quickly return home at the end of a night out with the inventive system. Moreover, because the drivers are professional, it is relatively unlikely that accidents due to intoxication, fatigue, and so forth will occur.

As alluded to above, the system uses the mobile phone number of the client as the client identifier until such time as the client fully subscribes and obtains a username.

Thus, the first time that the user texts any message to the telephone number of the server, the system starts to store trip information and other information and associates it with that mobile phone number. This means that even if a client does not wish to subscribe, the user may still experience the full power of the system online at the outset. Moreover, when the user does subscribe, all the information is still be available for use and may be integrated into the account.

In accordance with the invention, the server can be accessed via a set of commands which can be texted to the server in certain forms, for example: "taxi groups [message". The system may also be made to accept abbreviations such as grps, group, and grp for groups.

In accordance with the invention, the user does not need to do anything before issuing the first command. More particularly, the server will supply the user with a pass code upon the user's first request.

The following are examples of commands which may be texted or e-mailed in to the server to perform various functions, as described. After being thus accessed, the server sends a reply in a reply text message.

| Command | Description | Example text to 999999 (the telephone number of the server) |
| --- | --- | --- |
| create [name | Manager creates a group of which text caller is manager | Create Bar VIPs |
| request [group | User requests to join a group | Request Bar VIPs |
| accept request [mobile number | Manager accepts a request to join a group from a caller with cell number 222 888 8832 | Accept request 222 888 8832 |
| kick [group [mobile number | Remove cell number 222 888 8832 from a group if you are manager | Kick Bar VIPs 222 888 8832 |
| list [group members | List group members of the specified group | List Bar VIPs |
| list groups | List groups of which you are a member | List groups |
| set postcode [home postcode | Sets the active postcode (or default postcode) for your profile | Set postcode 11226** (replace * with real postcode) |
| set name [firstname [lastname | Sets a name to associate with text caller account | Set name John Smith |
| profile | Returns your name, passcode and the current active postcode, using caller ID | Profile |

It is noted that a group can exceed the capacity of a single vehicle and that in response to this the server will provide multiple taxi cabs.

In accordance with the invention, it is contemplated that groups may be instituted which will automatically trust other groups. In other words, if an individual from one group is attempting to obtain a taxi, the system will attempt to schedule him or her with members of that group. If this is impossible, or and not practical or timely, the system will move the patron to another trusted group. Finally, if this alternative is not practical, the system will move the patron to any available group. Groups may be profiled to provide for compatibility in this last case.

Figure 3A:
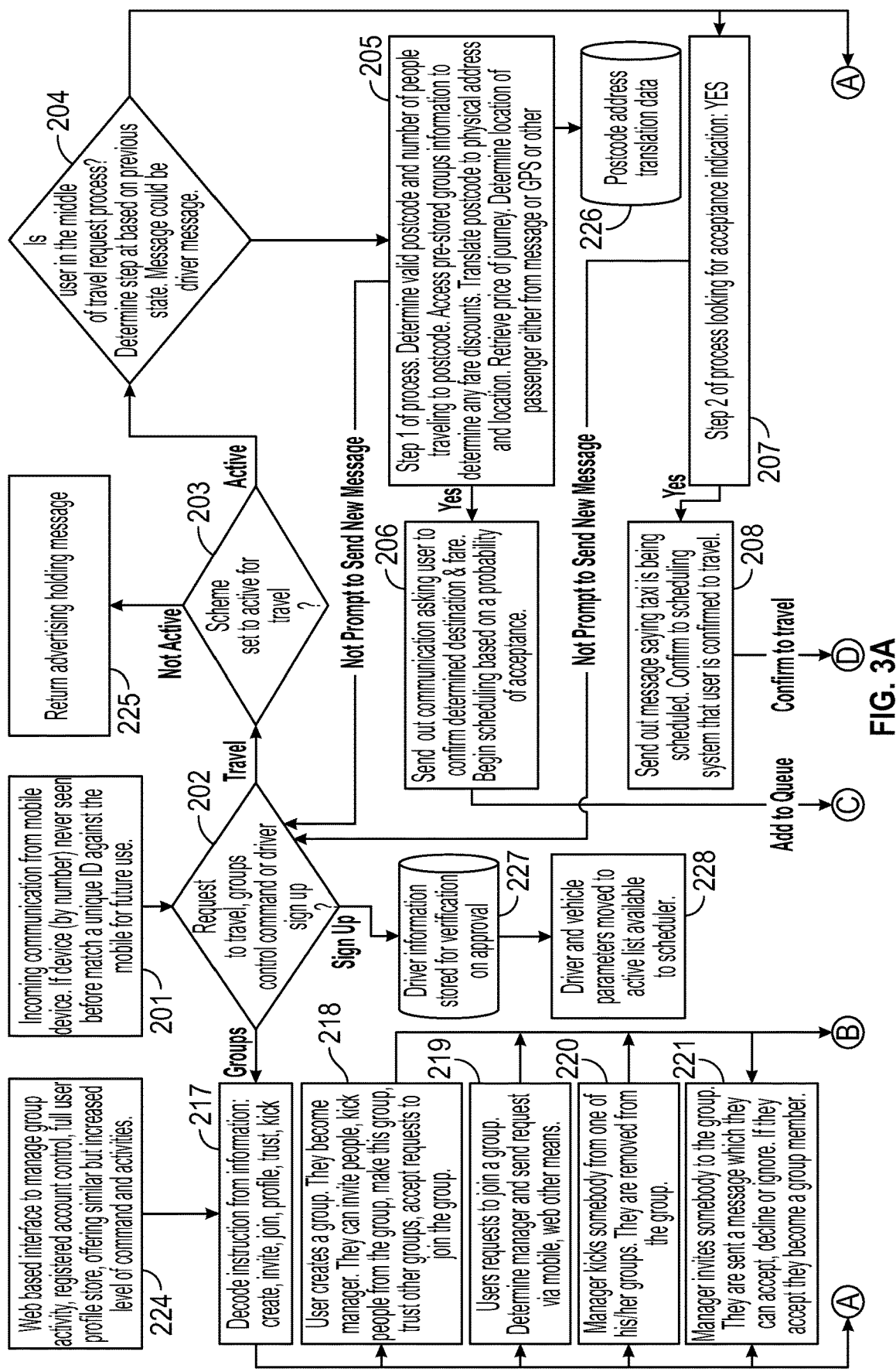
FIG. 3 is a block diagram of a particularly advantageous embodiment of the method/system of the present invention.
Figure 3B:
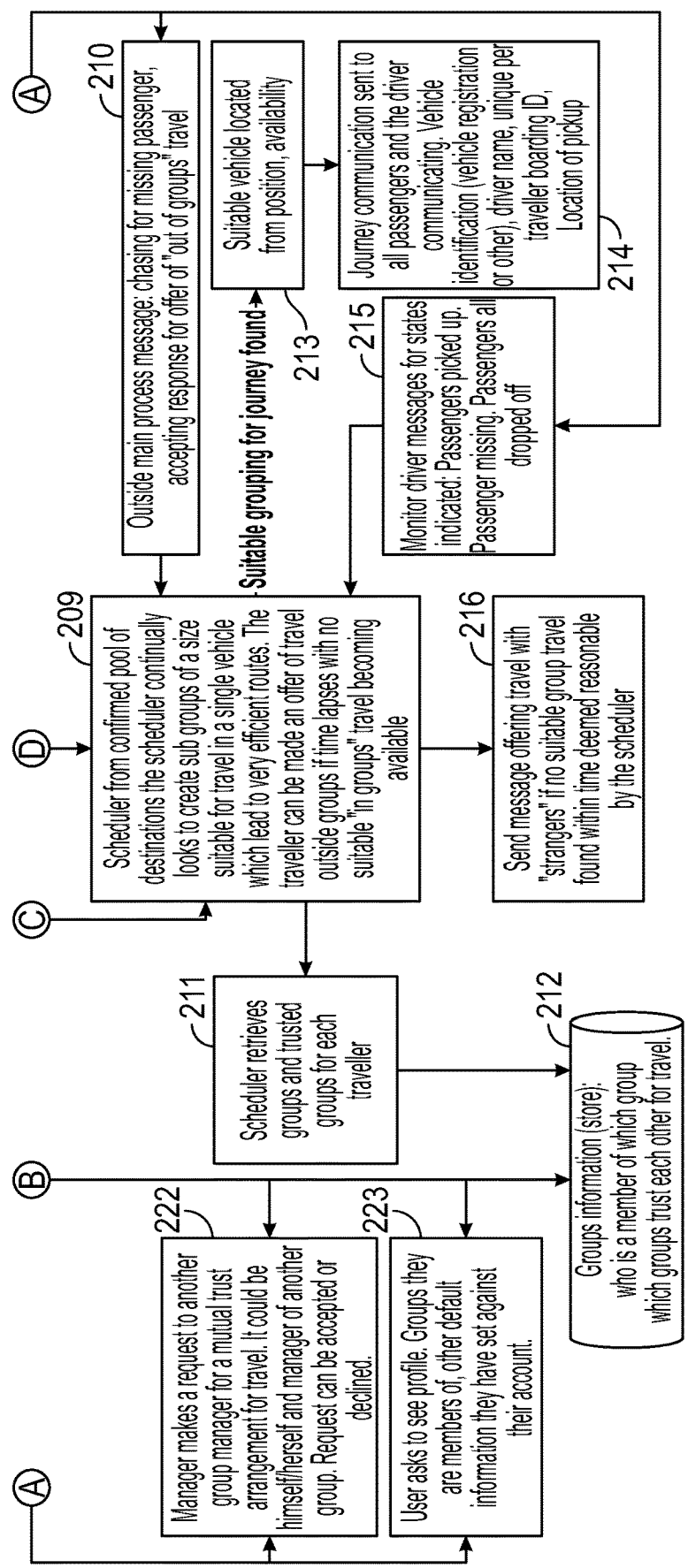

Referring to FIG. 3, the system has two main points of "access" by the end user. For travel and other activities (group, driver sign up) at step 201 and for enhanced group based activities, travel and driver sign up at 224.

The end user sends a message via text, SMS (billable), or other appropriate communication such as a specific mobile device application to the system at 201. If the mobile device identification (by number or other) is not recognized by a search of all previous unique numbers to access the system, then a unique account ID is assigned and associated with the mobile device identification.

The system determines what type of request has been made of it at 202.

This could be either a request to travel, a request by a driver to sign up to the scheme or a group manipulation command. The process forks depending on what information the system obtains from the command.

If the request is a travel request:

Process moves on to 203 where it is determined whether the scheme is active at that particular time. The scheme is designed to make efficient use of transport resources at peak travel times and so is not necessarily always active. If the scheme is turned off then an advertising message is returned to the user at 225 indicating when the scheme is running.

If the scheme is active:

The system has to determine the context of the message at process step 204. This will be based upon what previous messages have been delivered within the scheme session. Driver communication is recognized and filtered out to process step 215 based on identification of their mobile device as being included in the "active driver list" for that scheme session. The general no errors customer booking process is:

The user sends their postal or zip code, and also a meeting point identifier from a published list in that area A, B, C, D etc if mobile location or GPS location is not active, to the system via a central SMS number OR specific device related communication channel (hardware button or software) The postcode is validated and translated to a full house number, street name address and a message asking the user to confirm the booking is distributed including any legalese necessary.

The end user can accept by sending the SMS message yes; or decline by sending the SMS message no.

If the system detects an affirmation then it will send a message saying a taxi to the destination is being scheduled and confirm scheduling.

When a taxi is scheduled a message is sent to the driver and to all the passengers. The driver message communicates the number of passengers, a boarding ID for each passenger, a destination for each passenger, a flat fare for each passenger and a location to the meet the passengers. The customer message shows the drivers name, a passenger unique boarding ID, a vehicle registration by which to identify the taxi and a location to meet the taxi.

This is the "error free" process where each message arrives with the correct content as prompted.

The system will record, by way of status against the mobile device identification and the assigned unique ID, which is the current valid state of the booking process and which step the customer is advancing to now (and therefore the necessary message content).

If there is no previous communication from this mobile number or the system indicates the end user is still at the first step of the booking process;

At 205 the system obtains the fullest information it can from the message. This will be:

Valid postal or zip code

Number of people additional to the primary user travelling to the same location (plus 4=another 4 in addition to the mobile device carrier).

Accesses a pre-stored set of groups information for the user to determine who they may travel with in the group system.

Accesses any other pre-stored profile information of use.

Translates the postcode or zip code to a full house number and street name address.

Determines the flat fare price of the journey based on the destination and the groups and profile information (for discounts)

Determines the location of the passenger from mobile location or GPS tracking or similar OR from a published meeting point reference included in the initial message if these are not active or available.

The process then moves on to 206. The system will send the message asking for affirmation and confirming the translated address or original address and any legalese to the customer. The customers information will be inserted into the scheduler with a "conditional upon acceptance" state.

If the appropriate information could not be determined then the system sends back a message saying which pieces of necessary information (such as the postal or zip code) could not be validated in the original message and the end user will wait at the first step of the booking process on the next message (205 determined at 204).

The next travel request sent by this mobile device will tracked at 204 and if the end user had provided enough information to move to the second step of the booking process then the process moves to 207. If the system detects the affirmation it requires then the process moves on to 208 where a message is sent to the end user that a taxi is being scheduled to the translated address. The confirmation is passed through to the scheduler at 209 so that the scheduler knows it can include that person in a suitable passenger group and then proceed to 213.

If the system detects a cancellation response: no. Then it sends a message to the end user stating that the cancellation has been accepted. This message will be sent automatically after a predetermined cancellation period (of minutes) if the end user has not made any response. If the end user cancels then the booking process will be reset to the first step if they try to book again in that scheme session when any decision is made at 204

Once the scheduler has found a suitable group of passengers;

By using all the information available to it including information obtained from the social groups system at 211

The process moves on to 213 and the system locates a driver based on position and availability.

Once the driver is located the messages with the content already indicated in this text are sent to the driver and the passengers at 214.

If the system receives a driver message or communication determined at 204 then the process moves to 215.

The messages include:

A driver "logon" message. The driver is switched to an active state for the scheme session provided all commissions have been settled. LOGON A driver "logoff" message. Driver removes themselves from the active state. LOGOFF A driver "is waiting" message. The driver has arrived at the meeting point and is awaiting passengers. WAITING A driver "is transporting" passengers message. The driver has picked up all the passengers and is en-route to destination. GO A driver is "has completed drop-off" message. The driver has dropped off all the passengers. CLEAR A "passenger is missing" message. The driver can indicate that some passengers have arrived and others not. MISSING These messages are fed into the scheduler at 209 such that the scheduler can regroup people, knows a driver is or is not available, send chaser messages (messages asking where passengers are etc.), confirm completed journey reports.

If the message is a response to a chaser message determined at 204;

Then the process proceeds to 210 for determination of a response if any.

If the scheduler cannot find appropriate groups based travel (because there are not enough people from the "trusted" groups list for that person traveling at a given time) then it can make an offer of travel outside a group (as a chaser message) and look for an affirmative response similar to 207 before allowing that person into a passenger group and proceeding to 213

At 202 if a driver sign up message is detected then the process moves to 227. The drivers vehicle parameters; description, type, capacity, registration are stored and the driver is contacted to complete legal paperwork out of system process before being cleared to be available for the active list. More information is stored for the automatic payment systems after this is complete.

At 228 once the legal work has been completed and additional parameters set—such as commission—the driver is now available for logon and to the scheduling system.

If the message is a groups manipulation message;

By way of brief background, the inventive system is a social networking structure that allows end users to join and manage groups with the ultimate purpose being the placing of these people together as passenger groups for travel. These groups are much wider than multi-person travel which is simply a group of individuals who happen to be together travelling to the same destination on the same mobile device request (plus 4 etc.). These groups can be large containing hundreds of people each and each person can be a member or a manager of as many groups as they like. Likewise, in principle, optionally and alternatively to the preferred embodiment, groups may contain several managers, for example a backup manager when the primary manager is not available. Managers of groups can exchange mutual trust agreements that will extend to all members of the groups.

People are deemed able to travel with other people "in groups" when all passengers in the taxi intersect in a group. An example of this is as follows:

| End Users | Group | Super Stars | Legal Eagles | Breakfast Club | Bar VIPS |
|---|---|---|---|---|---|
| Gary |  | Yes | Yes |  |  |
| Michelle |  |  |  | Yes | Yes |
| Mark |  |  | Yes |  |  |

*Breakfast Club has a mutual trust arrangement with Legal Eagles
*Yes indicates group membership (either manager or normal member)

This means that if these individuals are all traveling at a similar time and their travel requests arrive at the scheduler then the scheduler will know that it has an intersection point on Legal Eagles for all these travelers (Michelle by way of the trust agreement) and can therefore place them for "in groups" travel.

Decode web instructions or mobile device instructions at 217 based on simple verbs or on complex mobile application input;

At 218 the language for creating a group has been detected. It is given the designated name and the end user as identified by their mobile device or web login is set as the manager. This information is stored immediately at 212 to be accessed by the scheduler and the groups systems.

At 219 the language for an end user requesting to join a specific group is detected. The request is passed to the manager by email, by SMS or through the web based interface or a combination and affirmation is waited upon. The manager can accept or decline the request. If the manager accepts then the end user becomes a member of that group. This information is stored immediately at 212 to be accessed by the scheduler and the groups systems.

At 220 the language for a manager kicking somebody out of a group (removing them) is detected. The designated end user is removed from the group and notified by email, SMS or the web interface, or a combination. This information is stored immediately at 212 to be accessed by the scheduler and the groups systems.

At 221 the language for a manager inviting somebody to a specific group is detected. The designated person is passed the invitation by SMS, email, web interface or a combination. An affirmation is awaited. The designated end user can either accept or decline. If the end user accepts then the end user becomes a member of that group. This information is stored immediately at 212 to be accessed by the scheduler and the groups systems.

At 222 the language for a manager requesting to another manager for a group trust arrangement is detected. The request is passed to the other manager by email, by SMS, the web interface or a combination. An affirmation is awaited. The designated manager can either accept or decline. If the manager accepts then the members of one group become trusted by the members of the other group for travel. There is the option (not mandatory) of a recursive trust arrangement whereby ALL the groups trusted by one group become trusted by another group and all groups trusted by those groups are trusted by the first group This information is stored immediately at 212 to be accessed by the scheduler and the groups systems.

At 223 the language for the end user asking for profile information is detected. The user is sent a canned set of information depending on the profile command. (examples, group membership lists etc.)

While an illustrative embodiment of the invention has been described, it is, of course, understood that various modifications will be obvious to those of ordinary skill in the art. Such modifications or within the spirit and scope of the invention which is limited and defined only by the appended claims.

The invention claimed is:

1. A method for dispatching a taxi comprising:
  performing, by a central server comprising a memory storing instructions, and a processor coupled to the memory, when executed by the processor, the method comprising:
  communicating with at least one network to process transportation requests received from a plurality of cellular telephones each of the cellular telephones corresponding to at least one of a plurality of passengers;
  automatically obtaining traveling information and a unique mobile identifier for each transportation request based on a mobile phone number or a mobile identification associated with each of the plurality cellular telephones, wherein the traveling information comprises a pickup location, a pickup time, a number of passengers, and a destination for each of the plurality of passengers;
  scheduling the plurality of passengers from each transportation request into one or more groups based on a close proximity between the pickup locations, the pickup times, and the destinations for each of the plurality of passengers;
  determining whether each of the plurality of passengers belongs to an existing trusted group by matching the unique mobile identifier with the unique mobile identifier previously registered in a database, wherein a trusted group is a recursive trust arrangement of all groups trusted by one group, wherein the trusted group becomes trusted by another group and all groups;
  generating a journey for each group of the plurality of passengers based on the trusted group and non-trusted groups comprising a sequence of stops at each pickup location, the pick time, and the destination for each of the plurality of passengers;
  generating a list of available transportation service vehicles based on a capacity of the transportation service vehicle for the determined trusted group of the plurality of passengers, and a proximity between a current location of each traveling transportation service vehicle and the pickup location and a proximity between a current location of each group of the plurality of passengers and the pickup location, wherein the current location of the transportation service vehicle is obtained from a GPS receiver of a cellular telephone associated to a driver of the transportation service vehicle, and the current location of each group of the plurality of passengers is obtained from a GPS receiver of a cellular telephone associated to each group of the plurality of passengers;
  transmitting the journey to the one or more transportation service vehicles and each of the plurality of passengers of the group to confirm the journey within a predetermined time period;
  automatically detecting affirmations from each of the plurality of passengers of the group within the predetermined time period;
  in response to confirmations, assigning one or more transportation service vehicles from the list of available transportation service vehicles to serve each group of the plurality of passengers based on the close proximity between the current location of the one or more transportation service vehicles and a first pickup location of the journey.

2. The method of claim 1, wherein a second passenger of the plurality of passengers being from a second predetermined trust group, said predetermined trusted group and said second predetermined trusted group being related together by a mutual trust agreement, and scheduling further includes requesting confirmation of the received transportation request when the predetermined trusted group and the second predetermined trusted group are related by the mutual trust agreement.

* * * * *